March 17, 1970 R. D. FARNSWORTH 3,500,944
CONVERTIBLE WHEELED AND TRACKED VEHICLE
Filed April 4, 1968 3 Sheets-Sheet 1

INVENTOR.
ROSS D. FARNSWORTH
BY~ Maybee & Legris
ATTORNEYS

March 17, 1970     R. D. FARNSWORTH     3,500,944
CONVERTIBLE WHEELED AND TRACKED VEHICLE
Filed April 4, 1968     3 Sheets-Sheet 3

INVENTOR.
ROSS D. FARNSWORTH
BY Maybee & Legris
ATTORNEYS

United States Patent Office 3,500,944
Patented Mar. 17, 1970

3,500,944
CONVERTIBLE WHEELED AND TRACKED VEHICLE
Ross D. Farnsworth, R.R. 2, Huntsville, Ontario, Canada
Filed Apr. 4, 1968, Ser. No. 718,833
Int. Cl. B26d 11/00, 55/08
U.S. Cl. 180—6.24          10 Claims

ABSTRACT OF THE DISCLOSURE

A vehicle adaptable for travelling on wheels or on tracks having two track members each of which comprises a pair of spaced apart rubber belts joined together in parallel relationship by a plurality of metal channel members. The channel members are of channel-shaped cross section throughout the entire length thereof, have straight portions at each end with a U-shaped portion at the middle and are attached to the inner sides of the belts with the open side of the channel-section facing outwardly on the track member. Spacing members are located between the straight portions of the channel members and the belts to maintain a spaced relationship therebetween.

BACKGROUND OF THE INVENTION

There has been a pressing need in recent years for vehicles which will travel without difficulty on frozen lakes and rivers, over swampy ground and muskeg and through deep snow. A great many designs have been devised for vehicles which are useful for such purposes and a number of these vehicles are multipurpose, being operable both over frozen lakes and rivers and over muskeg. Many vehicles developed for operating over adverse ground conditions are useful for travelling over heavy snow or ice but not over muskeg or might be useful in muskeg but not in heavy snow. All of these vehicles designed for heavy ground conditions in areas where roads are not available have the serious drawback of being not easily operable on roads, and particularly on highways.

In United States Patent No. 3,199,620 and in Canadian Patent No. 703,157 tracks for wheeled vehicles are disclosed comprising parallel spaced rubber belts joined by a plurality of metal connecting members having U-shaped cross sections with U-shaped centre portions in which the wheels run. The metal connecting members disclosed in both these patents are located, however, on the outside of the track and are not spaced from the rubber belts. With such a construction it is found that the metal connecting members are sometimes easily torn from one or more of the belts and, also, the whole length of each metal member is exposed to damage by striking rocks and other hard objects. Furthermore, there is a considerable danger of damage to the belts through cutting thereof by the metal members which are in direct contact with the belts.

The construction of the present invention avoids the foregoing difficulties by placing metal connecting members on the inner sides of spaced rubber belts with spacing members being located between the belts and the metal members.

SUMMARY

In the present invention a track for a wheeled vehicle is provided comprising a pair of spaced apart rubber belts connected at their ends to form continuous loops. The belts are held in spaced apart parallel relationship by metal channel connecting members of channel-shaped cross section throughout the entire length thereof, the members having straight portions on each end and a U-shaped portion in the middle. The connecting members are attached at their straight portions to the inner sides of the belts but with spacing members therebetween to maintain the members and belts in spaced relationship. The open side of the channel-section of each connecting member faces outwardly on the track member and the U-portion in each connecting member projects outwardly on the track member between the rubber belts to provide a retaining and running groove for wheels on the wheeled vehicle. Cleat members are provided on the outside of the belts for traction.

It is an object of the present invention to provide a wheeled vehicle which is operable on tracks readily fitted over the wheels on each side of the vehicle.

Another object of the invention is to provide novel track members for a wheeled vehicle which are easily installed on and removed from the vehicle.

Other objects and advantages of the invention will become obvious from the following description taken in conjunction with the accompanying drawing.

DESCRIPTION OF THE PREFERRED EMBODIMENTS

Generally speaking, the present invention relates to a track for a wheeled vehicle comprising a pair of spaced apart flexible belts with attaching means on the ends of each belt adapted to connect the ends of each belt together and form continuous loops therefrom. The spaced apart flexible belts have a plurality of connecting members attached to them joining the belts in parallel relationship. The connecting members have straight portions on each end and a U-shaped portion in the middle and are integrally attached at their two straight portions to each of the spaced apart belts, respectively. The connecting members are attached to the belts so that their U-portions project outwardly from the track between the flexible belts with the U-portions being adapted for and providing a retaining and running groove for wheels on a wheeled vehicle. Cleat members are located on the outside of each belt to provide traction for the track.

Figure 1:
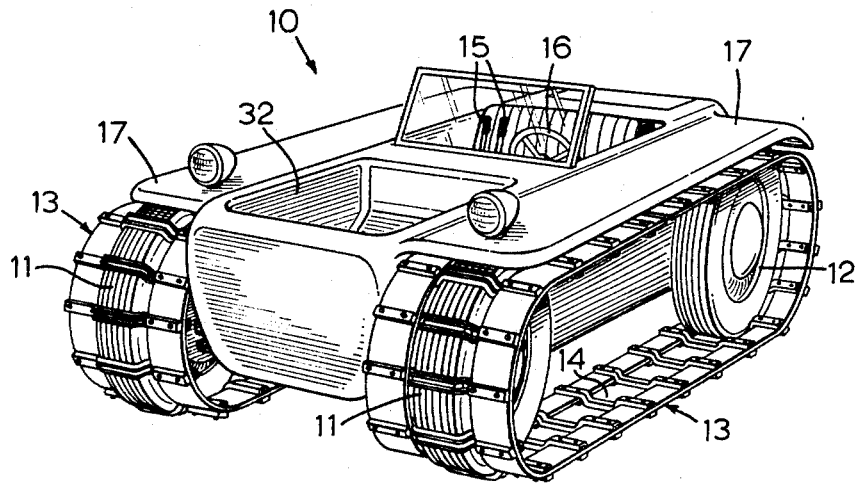
FIG. 1 is a perspective view of a vehicle embodying the present invention.

Referring now to the drawings a vehicle 10 embodying the invention is shown in FIG. 1 equipped with front wheels 11 and rear wheels 12 (the right rear wheel being hidden), advantageously with rubber tires located theren. The vehicle 10 has a driving engine located therein driving the rear wheels 12 or alternatively both the front and rear wheels 11, 12. The vehicle 10 has track members 13 on each side located on and running over the front and rear wheels 11, 12. The wheels 11, 12 are retained in a running groove 14 in the track members 13. The vehicle 10 has steering means located thereon operated advantageously by levers 15 for steering the vehicle with the tracks 13 located thereon and another steering means such as steering wheel 16 for steering the vehicle as an ordinary wheeled vehicle with the tracks 13 removed therefrom. Advantageously, fenders 17 are located on the vehicle projecting over the tracks 13.

Figure 2:
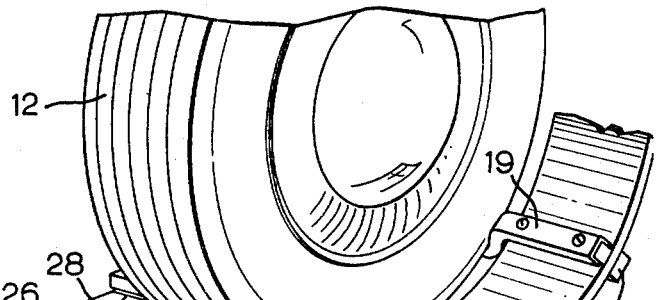
FIG. 2 is a perspective view of a portion of one of the novel tracks shown in FIG. 1, embodying the invention, with a wheel of the vehicle shown located therein.
Figure 2:
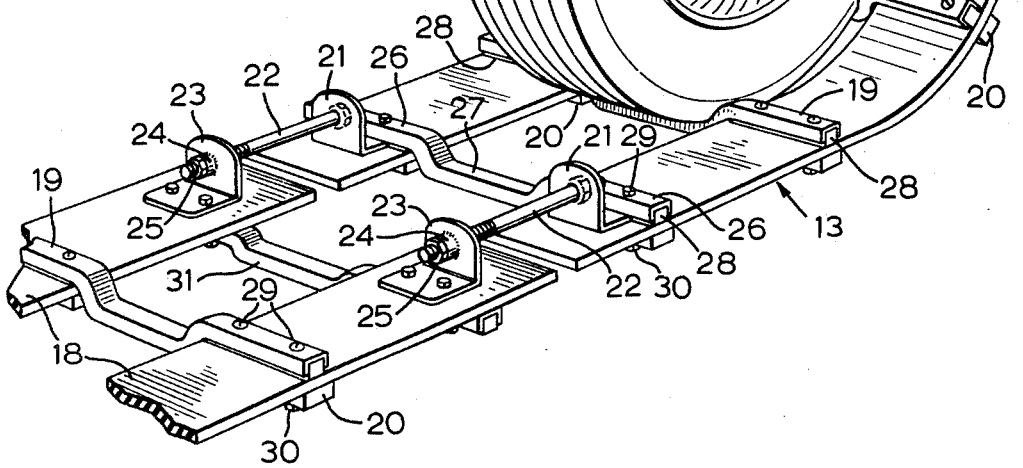

One of the track members 13 is shown in greater detail in FIG. 2 which illustrates a broken-away portion of the track member 13 installed around one of the rear wheels 12 of the vehicle. Connected end portions of the track member 13 are also shown in FIG. 2. The track member is seen to comprise a pair of spaced apart flexible belts 18, advantageously a heavy gauge reinforced rubber type, connecting members 19 joining the flexible belts 18 in parallel, spaced apart relationship and cleat or tread members 20 attached to the underneath surface of the belts 18.

The ends of the belts 18 are connected with releasable connecting means, such as shown in FIG. 2, to form a continuous track loop. The connection between belt ends should be such as to prevent severe bending of the track member at the joint and in the embodiment shown in FIG. 2 a pair of flanges 21 for holding bolts 22 through holes in the flanges are attached to one end of the belts 18 and a second pair of flanges 23 are located on and attached to the other end of the belts 18 with receiving collars 24 located therein for receiving and holding the bolts 22 in aligned relationship with the belts 18. Nuts 25 fasten the bolts 22 in position. It can be seen that the ends of the belts 18 in the track member 13 can be easily and quickly disconnected to allow the track to be removed from the vehicle. Conversely, the track members can be quickly and tightly installed over the wheels of the vehicle using the connection means shown. Other types of releasable connections may be used for connecting the belt ends together. Thus, hinged bolts may be used on one set of flanges seating into slotted portions on the set of receiving flanges. It is to be noted that installation of the treads on the wheels of the vehicle is very much facilitated by use of a tool or tool members which draw the ends of the belts together in aligned relationship to allow seating of the connecting bolts.

The connecting members 19 are advantageously of metal construction to provide the required strength for the belt and the required stiffness for wheel and ground traction. To reduce the weight of the track without substantial loss of strength the connecting members 19 are constructed from members with a channel-shaped cross section throughout the entire length thereof, as shown in FIG. 2. The members 19 have substantially straight portions 26 on each end and a U-shaped portion 27 in the middle and are bolted to the tops of the belts 18 with the open portion of the channel facing outwardly on the track. The cleat members 20, advantageously of rubber or reinforced rubber are bolted to the bottom of the belt, in opposing fashion to the straight end portion of the connecting members 19. To prevent damage to the belt 18 by the connecting member 19 a rubber insert member 28 is advantageously located in the channel member 19 and is somewhat deeper than the channel depth to maintain the member 19 in spaced relationship with the belt 18. Bolts 29 run through the connecting member 19, the insert member 28, the belt 18 and the cleat 20 and the whole assembly is held together by nuts 30 placed over the bolts 29.

The connecting members 19 are seen to be attached to the belts 18 with the U-portions 27 projecting outwardly from the track 13. The series of U-portions in the connecting members 19 forms the retaining and running groove 14 (shown in FIG. 1) for the wheels on the vehicle. Advantageously, these U-portions are shaped so as to grip the tread and a portion of the side-walls of the tires on the particular vehicle to which the tracks are fitted to provide maximum purchase of the tires in the tracks. When the vehicle is in motion the rotating wheels grip the connecting members 19 and cause the track members 13 to move around the wheels as the vehicle progresses. At the same time the belt portions 18 of the tracks provide a large support area for the vehicle when operating through snow and muskeg. The cleats 20 provide excellent traction for the racks on ice or in snow and also in muddy or marshy ground. When it is desirable to travel on roads or highways the tracks are readily removed, allowing the vehicle to travel on the rubber tires located on the wheels.

It is to be noted in the embodiment shown in FIG. 2 that one of the connecting members at the connected ends of the belts 18 is advantageously a shallower member 31 attached to the outside of the belts to allow easier access to the receiving flanges 23 and connecting nuts 25 when releasing and attaching the track members. The bolts and nuts 22, 25, and in particular the bolts and nuts 29, 30, connecting the track components, are preferably made of a corrosion resistant metal to allow easy removal of installation after continued use. Cadmium plated bolts and nuts are found to be very effective.

Figure 3:
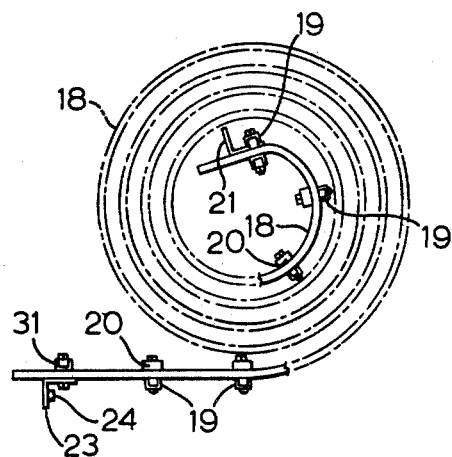
FIG. 3 is a perspective view of one of the tracks of the vehicle shown in FIG. 1, removed from the vehicle and partially rolled into a coil.

One of the important advantages of the novel track of the invention is that it can be readily rolled into a compact, easily stored bundle and in FIG. 3 of the drawings is shown one of the tracks 13 removed from the vehicle and partially rolled into a coil. The coiled tracks can be stowed in a small storage area such as in the compartment 32 on the vehicle 10, shown in FIG. 1.

Figure 4:
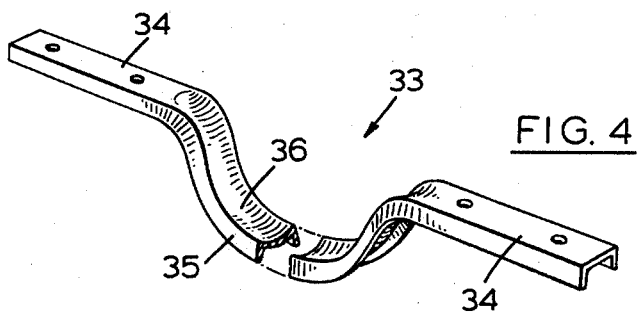
FIG. 4 is a perspective view of a metal connecting member of somewhat different construction from those shown in FIG. 2.
Figure 5:
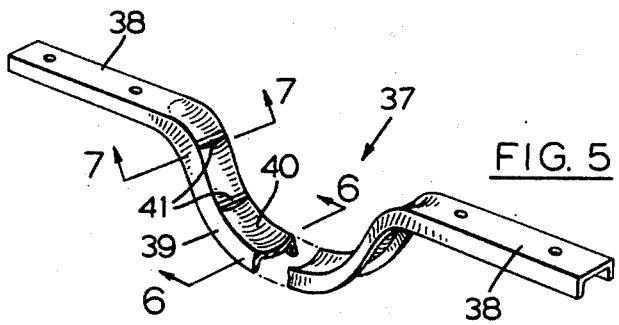
FIG. 5 is a perspective view of still another variation in a metal connecting member, shown partially broken away.

Although in FIG. 2 the connecting members 19 are shown with flat upper surfaces on the U-portions 27, the connecting members may advantageously have the configurations shown in FIGS. 4 through 7. Thus, referring to FIG. 4, a connecting member 33 is shown with substantially straight end portions 34 and a U-shaped middle portion 35 which is of curved configuration and has a concave upper surface 36. Connecting member 37 shown in FIG. 5 is of the same configuration as the member 33 of FIG. 4 with flat, straight end portions 38 and curved U-shaped portion 39 having a concave upper surface 40, except that the connecting member 37 has a plurality of dividing wall portions 41 welded into place along the concave upper surface 40.

Figure 6:
FIG. 6 is a section through line 6—6 of FIG. 5.
Figure 7:
FIG. 7 is a section through line 7—7 of FIG. 5.

The shape of the concave portions of the connecting members of FIGS. 4 and 5 is shown by way of the broken-away portion in each figure and is shown more clearly by FIG. 6 which is a section through line 6—6 of FIG. 5. FIG. 7 is a section through line 7—7 of FIG. 5 and shows the concave upper surface 40 of the connecting member 37 and one of the dividing wall portions 41. Section 7—7 shown in FIG. 7 depicts the flattening of the member 37 caused by the gradual bend therein and the concavity of the upper surface.

The curved configuration of connecting members 33, 37 of FIGS. 4 and 5 is found to provide a better fit for the tires of a wheeled vehicle, such as shown in FIG. 1, and, at the same time, the concave upper surfaces 36, 40 provide a suction and gripping effect on the tires. This suction and gripping effect acts to hold the connecting members tightly against the tires and prevents throwing of the tracks from the wheels of the vehicle. Provision of the dividing wall portions 41 across the concave upper surface 40 of connecting members, as shown in FIG. 5, sets up a number of suction "cups" or separated suction areas on each connecting member which improve the gripping forces on the tires even further.

Steering of the vehicle with tracks installed is found to be readily accomplished by using two sets of braking cylinders, one for each side of the vehicle and operated, for example, by the levers 15 shown in FIG. 1. Braking of the driving wheel or wheels on one side of the vehicle causes the vehicle to turn in that direction. A control is advantageously used to cause simultaneous operation of the braking cylinders for ordinary braking of the vehicle. Steering of the vehicle with tracks removed is accomplished with the steering wheel 16 shown in FIG. 1 through any front wheel steering and linkage system commonly used on wheeled vehicles. An example of a suitable type of steering mechanism for this purpose is disclosed in the U.S. Patent to Kropp No. 2,698,667.

It is to be noted that the present invention provides a vehicle adaptable for use on a great variety of terrains. As a tracked vehicle it is readily operable in deep snow, on ice, on rough ground, in soft or muddy soil and in swamp or muskeg. By using a waterproof body the vehicle can be used for fording small streams while using locomotion provided by the moving tracks. The tracked vehicle is very quickly convertible to a wheeled vehicle for operation on roads and highways. The novel tracks of the invention are so constructed as to be usable with a great variety of wheeled vehicles with simple modifications being made to provide clearance for the track members.

What I claim as my invention is:

1. A track for a wheeled vehicle comprising a pair of spaced apart rubber belts with attaching means on the ends of each belt adapted to releasably connect the ends of each belt together and form continuous loops therefrom, a plurality of metal channel connecting members joining said rubber belts in parallel relationship, said connecting members each being of channel-shaped cross section throughout the entire length thereof and having substantially straight portions on either end thereof and a U-shaped portion at the middle thereof, the connecting members being attached at their straight portions to the inner sides of the spaced apart belts with the open side of the channel-section facing outwardly on the track member and the U-portions projecting outwardly from the track between the rubber belts, spacing members located between the straight portions of the connecting members and the belts to maintain the connecting members in substantially spaced relationship with the belts and rubber cleat members providing traction for the track located on the outside of each belt in opposing fashion to the straight end portions of the metal connecting members, said U-portions in said connecting members being adapted for and providing a retaining and running groove for wheels on a wheeled vehicle.

2. A track for a wheeled vehicle as claimed in claim 1 wherein the U-portions of the connecting members have concave upper surfaces for contact by the wheels of a wheeled vehicle.

3. A track for a wheeled vehicle as claimed in claim 2 wherein the concave upper surfaces of the connecting members have a plurality of dividing wall portions therein providing a number of separated suction areas in each connecting member.

4. A vehicle having at least four wheels and two removable track members located on each side of said vehicle over said wheels, said vehicle being adapted for running on said track members and on said wheels upon removal of said track members, each said track member comprising a pair of spaced apart rubber belts, each belt having its ends connected together with releasable connecting means to form continuous loops on said track member, a plurality of metal connecting channel members joining said rubber belts in parallel, spaced apart relationship, each metal connecting member being of channel-shaped cross-section throughout the entire length thereof and having substantially straight portions on either end thereof and a U-shaped portion at the middle thereof between the rubber belts and each connecting member being attached at each straight end portion to each spaced apart belt, respectively, on the inner side of the belts on said track member, with the open side of the channel-section facing outwardly on the track member and the U-shaped portion of each connecting member projecting outwardly from the track member between the rubber belts, spacing members located between the straight portions of the connecting members and the rubber belts to maintain the connecting members in substantially spaced relationship with the rubber belts, cleat members providing traction for the track attached to the outside of each belt and positioned in opposing fashion to the straight end portions of the metal connecting channel members, said U-portions in the connecting members being adapted for and providing a retaining and running groove for the wheels on the vehicle, and steering means on the vehicle for steering thereof with tracks located on the wheels.

5. A vehicle as claimed in claim 4 which has further steering means thereon for steering the front wheels of the vehicle with tracks removed from the wheels.

6. A vehicle as claimed in claim 4 in which a connecting member, spacing member, rubber belt and cleat member are connected together by the same fastening means.

7. A vehicle as claimed in claim 4 in which the wheels have rubber tires thereon and the U-portions in the connecting members have a shape adapted to grip the tread and the lower portions of the sidewalls of said rubber tires on the vehicle wheels.

8. A track for a wheeled vehicle as claimed in claim 4 wherein the U-portions of the connecting members have concave upper surfaces for contact by the wheels of a wheeled vehicle.

9. A track for a wheeled vehicle as claimed in claim 8 wherein the concave upper surfaces of the connecting members have a plurality of dividing wall portions therein providing a number of separated suction areas in each connecting member.

10. A vehicle having at least four wheels with rubber tires thereon and two removable track members located on each side of said vehicle over said wheels, said vehicle being adapted for running on said track members and on said wheels upon removal of said track members, each said track member comprising a pair of spaced apart rubber belts, each belt having its ends connected together with releasable connecting means to form continuous loops on said track member, a plurality of metal connecting channel members joining said rubber belts in parallel, spaced apart relationship, each metal connecting member being of channel-shaped cross section throughout the entire length thereof and having substantially straight portions on either end thereof and a U-shaped portion at the middle thereof between the rubber belts and each connecting member being attached at each straight end portion to each spaced apart belt, respectively, on the inner side of the belts on said track member, with the open side of the channel-section facing outwardly on the track member and against the rubber belts and the U-shaped portion of each connecting member projecting outwardly from the track member between the rubber belts, a rubber spacing member between the straight portions of the connecting channel members and the rubber belt to maintain the channel member in substantially spaced relationship with the belt, rubber cleat members providing traction for the track attached to the outside of each belt and positioned in opposing fashion to the straight end portions of the metal connecting channel members, a connecting member, rubber insert, rubber belt and cleat being bolted together with the same fastening means, said U-portions in the connecting members being adapted for and providing a retaining and running groove for the rubber-tired wheels on the vehicle and having a shape adapted to grip the tread and the lower portions of the side walls of the rubber tires on the vehicle wheels, first steering means on the vehicle for steering thereof with tracks located on the wheels, and second steering means in the vehicle for steering the front wheels of the vehicle with tracks removed therefrom.

References Cited

UNITED STATES PATENTS

| | | | |
|---|---|---|---|
| 1,501,097 | 7/1924 | Chase | 305—35 |
| 2,698,667 | 1/1955 | Kropp | 180—9.2 |
| 2,749,189 | 6/1956 | France | 305—35 |
| 3,091,837 | 6/1963 | McCormick | 305—37 X |
| 3,165,364 | 1/1965 | Hardman | 305—57 X |
| 3,199,620 | 8/1965 | Wheeler | 305—35 X |

FOREIGN PATENTS 687,438 2/1953 Great Britain.

RICHARD J. JOHNSON, Primary Examiner

U.S. Cl. X.R.

180—6.7; 305—35